United States Patent [19]

Kuwagaki et al.

[11] 4,396,253
[45] Aug. 2, 1983

[54] ELECTRO-CHROMIC DISPLAY DEVICES

[75] Inventors: Hiroshi Kuwagaki, Kyoto; Hiroshi Hamada, Nara; Tadanori Hishida, Nara; Tomio Wada, Nara, all of Japan

[73] Assignee: Sharp Kabushiki Kaisha, Osaka, Japan

[21] Appl. No.: 218,418

[22] Filed: Dec. 19, 1980

[30] Foreign Application Priority Data

Dec. 24, 1979 [JP] Japan .............................. 54/168927

[51] Int. Cl.³ .............................................. G02F 1/17
[52] U.S. Cl. .................................................... 350/357
[58] Field of Search ............... 350/357, 363, 334, 343; 339/DIG. 3

[56] References Cited

U.S. PATENT DOCUMENTS 3,990,781 11/1976 Gum ..................................... 350/343
4,252,990 2/1981 Sado ............................. 339/DIG. 3
4,331,385 5/1982 Kondo et al. ...................... 350/357

Primary Examiner—James W. Davie
Attorney, Agent, or Firm—Hubbell, Cohen, Stiefel & Gross

[57] ABSTRACT

An electro-chromic display device comprises an electro-chromic material and an electrolyte between a display electrode formed by a combination of a plurality of segments, and counter electrode disposed opposite thereto, and undergoes a reversible reaction for developing or erasing a color upon application of voltage or reverse polarity voltage. The counter electrode comprises a molded product obtained by molding under pressure a mixture of the powders of a solid oxidation-reduction type active material and an electrically conductive material.

15 Claims, 13 Drawing Figures

ELECTRO-CHROMIC DISPLAY DEVICES

BACKGROUND OF THE INVENTION

1. Field of the Invention

This invention relates to an electro-chromic display in which reversible changes in color are obtained by application of an electrical field to an electro-chromic material and which is, for example, utilized for a digital display watch or a portable electronic calculator.

2. Description of the Prior Art

An electro-chromic display generally comprises a display electrode formed by a combination of segments, a counter electrode positioned opposite to the display electrode and defining a passage for electric current therebetween, and an electro-chromic material and an electrolyte provided in the passage for electric current, and accomplishes coloration and discoloration reversibly upon application of an electrical field.

In the event the counter electrode is formed from tungsten oxide by evaporation or sputtering (and the display electrode is also made of tungsten oxide without being limited thereto), it has a chemical composition which is very close to that of $WO_3$ and permits no further oxidation. In order that the reversible reaction takes place, tungsten oxide counter electrode should be kept in a partially reduced state. For this purpose, it would be necessary to apply such high voltage as to be composed the electrolyte at the beginnings of the operation, or else be necessary to employ a technique taught in U.S. Pat. No. 3,840,287. Then, tungsten oxide will change as follows,

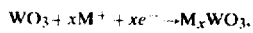

$$WO_3 + xM^+ + xe^- \rightarrow M_xWO_3,$$

where x is a value from 0 to 1, M stands H, Li, Na or other metal and $M_xWO_3$ is the same chemical formula as that of tungsten bronze. The parameter x denotes the degree of reduction, and it increases in the reduction while it decreases in the oxidation. When an electro-chromic display device is operated to color the display electrode, x decreases as the result of the oxidation at the counter electrode, and with the decoloration, it increases as the result of the oxidation. If a value of x is small, the counter electrode cannot afford sufficient charge to conduct the coloration operation. Moreover the equilibrium potential of $M_xWO_3$ depends largely on the value of x. For further details, see, for example, "Physical Review" B, 16, 1750 (1977), or "Journal of Electrochemical Society," 125, 1603 (1978).

Thus, it follows that if the device is operated at a "constant voltage driving" by application of a constant voltage for a pre-determined length of time across the display electrode and the counter electrode opposite thereto, the potential applied to the display electrode depends on the value x of the counter electrode, and thereby influences the density of the coloration developed on the display electrode. This may, for example, bring about the following disadvantages ("uneven coloration"):

(i) If a coloration pulse is applied to one segment after another, a later activated segment will have a lower degree of color density; and (ii) if a plurality of segments are driven simultaneously, their color density will become lower with an increase in the total area of the display electrodes which are driven simultaneously.

It is known to construct a cell by employing a greater value of x, as taught in U.S. Pat. No. 3,840,287. Even if this method is adopted, however, the oxygen dissolved in the electrolyte or the oxygen in the air entering the cell through its sealed portion causes the value of x to decrease with the lapse of time. It is, therefore, difficult to keep the value of x at at least 0.1. This tendency becomes more evident with an increase in the temperature of the environment in which the cell is situated, at thin film of tungsten oxide.

An increase in the charge capacity of the counter electrode at the fixed value of x may be expected by increasing the volume of tungsten oxide on the counter electrode. But it is not practical solution for the above-mentioned problem by the following reasons. If the counter electrode is too large as compared with the display electrode, however, it destroys a balance in the design of the display device. Moreover, it is difficult to obtain a sufficiently large film thickness by an ordinary method of evaporation and thick film would cause a voltage drop across its thickness. According to the conventional practice, a paste or fluid obtained by kneading powders of manganese oxide and carbon with a binder is coated on a conductor to form the counter electrode. The binder is selected from among oranic polymer compounds such as an epoxy, silicone or phenolic resin. The counter electrode prepared in accordance with the prior art, however, has a high degree of density polarization, and a high level of specific resistance. Accordingly, the device has a slow rate of response for coloration and discoloration, and moreover, the potential of the manganese oxide lacks stability. This is due to the fact that as the manganese oxide and carbon powders are covered with the binder, the manganese oxide has a lowered degree of activity, and the carbon powder has an increased degree of interfacial resistance.

In order to solve these problems, it has been proposed to use tar, pitch or theriac as the binder, and fire a mixture of manganese oxide and carbon powders and the binder at a temperature of one thousand and several hundred degrees centigrade to form a plate defining the counter electrode. The use of such a high temperature is, however, likely to result in the decomposition and phase change of manganese oxide, and disables its stability in potential to be advantageously manifested.

SUMMARY OF THE INVENTION

It is an object of this invention to provide the specific construction of an electro-chromic display which is stabilized in potential, superior in performance, and easy to manufacture.

The electro-chromic display of this invention is first featured by the use of a counter electrode disposed opposite to a display electrode, and formed by the pressure molding of a mixture of the powder of a solid redox type active material and the powder of a conductor.

The electro-chromic display of this invention is also featured by the construction of the conductor connected electrically to the counter electrode to supply an electric current thereto, and extending outwardly of the cell.

DETAILED DESCRIPTION OF THE INVENTION

In the electro-chromic display of this invention, the counter electrode disposed opposite to the display electrode is prepared by the pressure molding of a mixture of the powder of a solid redox type active material and the powder of a conductor. The active material may be a homogeneous or heterogeneous solid oxidation-reduction material. The homogeneous material may be an oxide, sulfide or selenide of a metal, preferably $WO_3$, $MoO_3$, CuS, CuSe, FeS, FeSe, $MnO_2$, $Mn_2O_3$, $Mn_3O_4$, MnO, $Nb_2O_5$, $V_2O_5$, $BiO_3$ or $M_xWO_3$ (in which M stands for H, Li or Na, and x is larger than 0.01, but smaller than 0.7), i.e., tungsten bronze, and more preferably, $MnO_2$, $Mn_2O_3$ or tungsten bronze. The heterogeneous material may be RFe(II) [Fe(III)(CN)$_6$] (in which R stands for $NH_4$, H, K or Na), i.e., Prussian blue, a metallophthalocyanine complex, an iron complex, a cobalt complex, or another transition metal complex, and preferably, Prussian blue. A single compound is usually used, but it is also possible to use a mixture of two or more compounds if required.

The powder of a conductor for use according to this invention may be of carbon, more specifically of expanded graphite, active carbon, graphite or carbon black. Expanded graphite or active carbon is particularly preferable.

According to this invention, the powder of a solid oxidation-reduction active material and that of a conductor have a mixing ratio by weight of preferably 1:0.8 to 100, and more preferably 1:1 to 20. These powders preferably have a grain size not greater than 300 mesh in accordance with the Japanese Industrial Standards.

A mixture of these powders is molded under pressure into the shape of a plate, and the plate is cut to a suitable size to form the counter electrode to be positioned opposite to the display electrode. The molding operation is usually carried out at room temperature, but may also be performed at an elevated temperature not exceeding about 100° C. The application of pressure may be effected by a hydraulic press having a capacity of, say, 5 tons/cm$^2$, or by rolling. The plate has a thickness of usually about 0.2 to 1.0 mm, and preferably about 0.25 mm.

According to this invention, the counter electrode thus prepared is electrically connected to a conductor which will supply an electric current to the counter electrode. More specifically, the conductor is secured to a display substrate or another substrate, and connected electrically to the counter electrode directly or through a conductive elastic body. If the conductor is in the form of a wire, it may extend outwardly of the cell to define an external terminal, or may be connected to a separate terminal.

The invention will now be described in further detail with reference to the drawings.

FIG. 1 (Prior Art)

Figure 1:
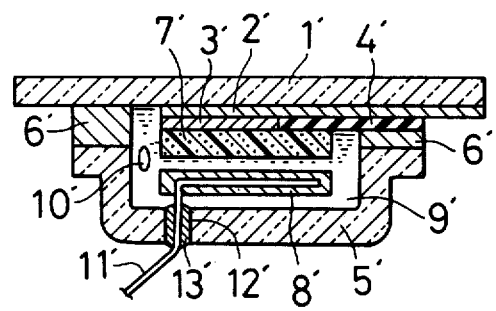
FIG. 1 is a cross-sectional view of an electro-chromic display (ECD) known in the art.

The cell shown in FIG. 1 includes a transparent display electrode 2' formed on a transparent glass substrate 1'. The transparent electrode 2' carries thereon a layer 3' of tungsten oxide ($WO_3$) as the electro-chromic material. An insulating film 4' is formed on the rest portion of the transparent electrode 2'. Another glass substrate 5' having the shape of a cap is positioned opposite to the glass substrate 1', and secured thereto with an adhesive 6'. Counter electrode 8' is provided on the opposite side of a white porous plate 7' from the electro-chromic material 3'. The hollow interior defined by the glass substrates 1' and 5' is filled with an electrolyte 9' in which a mass of bubbles 10' is present. The bubbles 10 absorb the thermal expansion of the electrolyte 9'. The glass substrate 5' is provided with a hole through which a lead wire 11' extends into the cell to establish electrical connection for the electrode 8'. The hole 12' is sealed tightly with a filler 13'.

In the known cell as hereinabove described, the piercing of the glass substrate 5' with the hole 12' is a cumbersome job adding to complication in the manufacturing process for the cell, lowering its productivity, and increasing its cost of manufacture. The electrode 2' is formed on the glass substrate 1', but as the lead wire 11' extends through the glass substrate 5', its connection with a driving circuit is not easy to carry out by means of a conventionally available connector. This is an important problem in practice.

FIGS. 2 TO 4

A transparent electrode 2 is formed on a transparent glass substrate 1. A layer of an electro-chromic material 3, such as a film of tungsten oxide ($WO_3$), is formed on the electrode 2 by evaporation. An insulating film 4 is formed on the rest portion of the electrode 2. A porous plate 7 covers the electro-chromic material 3. A counter electrode 16 is positioned on the opposite side of the porous plate 7 from the electro-chromic material 3. A cap-shaped glass substrate 5 having a flange 18 is secured to the glass substrate 1 with an adhesive 6, and the two glass substrates 1 and 5 define a gas-tight hollow interior space therebetween. A conductor 14 for supplying electric current is secured by evaporation or sputtering on the inner surface of the glass substrate 5, including its flange 18, and extends longitudinally thereof (in the horizontal direction as viewed in FIG. 2).

A conductive elastic material 15, such as a mass of carbon fibers, is disposed between the conductor 14 and the electrode 16. A terminal 17 is formed on the glass substrate 1 for electrical connection with the conductor 14 on the flange 18. The terminal 17 and the conductor 14 are electrically connected with each other through a metal foil 19 therebetween. The conductive elastic material 15 exhibits elasticity along its thickness (i.e., vertically when viewed in FIGS. 3 and 4). The preferred carbon fibers may, for example, by TORAYCA ® mat B 0030 (trade name of Toray, Japan). The aforesaid hollow interior space is filled with an electrolyte 9 which is a γ-butyrolactone solution of lithium perchlorate having a concentration of 1 mol per liter. The hollow interior space includes a mass of bubbles 10 which absorb the thermal expansion of the electrolyte 9 to prevent rupture of the glass substrates 1 and 5, and the like. The conductor 14 may be formed from a metal, a metal oxide such as indium oxide or tin oxide, graphite, carbon black or other type of carbon.

The electrode 16 comprises a plate obtained by molding at a pressure of 5 tons/cm$^2$ a mixture of manganese dioxide powder having a grain size of 300 mesh (JIS) and expanded graphite (EXP-F 200 of Nippon Graphite, Japan) which are mixed in a ratio by weight of 50:50. The electrode 16 has a specific resistance of less than 0.1 ohm-cm, and in the electrolyte 9 has a polarization resistance of less than 10 ohms per cm$^2$. According to the experiments conducted by the inventor of this invention, the electrode 16 maintained stability in its reversible potential during both the development and erasure of a color (i.e., at the display electrode during its oxidation and reduction) and even when it was left to stand at a high temperature of 70° C. The terminal 17 is formed on the glass substrate 1 for electrical connection with the conductor 14 on the flange 18. The terminal 17 and the conductor 14 are electrically connected with each other through the metal foil 19. It is possible to use a conductive adhesive instead of the metal foil 19. Expanded graphite may be prepared if graphite is immersed in sulfuric acid, dried, and heated.

The conductive elastic material 15 establishes the electrical connection between the conductor 14 and the electrode 16, and also serves to hold the porous plate 7 and the electrode 16 in position by virtue of its elasticity along its thickness. The conductor 14 and the electrode 16 abut resiliently on the conductive elastic material 15, and maintain substantial surface contact therewith. This arrangement advantageously leads to a reduction in the contact resistance of the conductor 14 and the electrode 16 on the conductive elastic material 15. Moreover, even if the electrode 16 is deformed or broken, proper electrical connection is maintained between the conductor 14 and the electrode 16. Accordingly, the electrode 16 does not need to be extremely strong, but is easy to manufacture. The bubbles 10 do not enter the conductive elastic material 15 because of their surface tension, but ensure that a proper electrochromic display be obtained.

According to the embodiment as hereinabove described, the manufacture of the electro-chromic display is completed by disposing the porous plate 7, the electrode 16 and the conductive elastic material 15 between the glass substrate 1 on which the electro-chromic material 3 and the like are provided, and the glass substrate 5 on which the conductor 14 is formed, and positioning the metal foil 19 between the conductor 14 and the terminal 17. Thus, it can be manufactured by a very simple process. According to the experiments conducted by the inventor of this invention, no "uneven coloration" of the kind observed in a known device employing a tungsten oxide as the counter electrode occurred to the device of this invention when a constant voltage was applied across the electrode 2 and the terminal 17. For initiating coloration in the device of this invention, it is not necessary to apply any such high voltage as has been required for the known device hereinbefore described; therefore, the device of this invention has a prolonged like. The device of this invention shows a response time of only about 300 m sec between the application of voltage and the development of the color by virtue of the small degree of polarization in the electrode 16, as opposed to a response time of about 1 second in the event the counter electrode comprises a molded product composed of manganese oxide and carbon powders, and an organic high molecular binder such as an epoxy, silicone or phenolic resin.

FIG. 5

Figure 2:
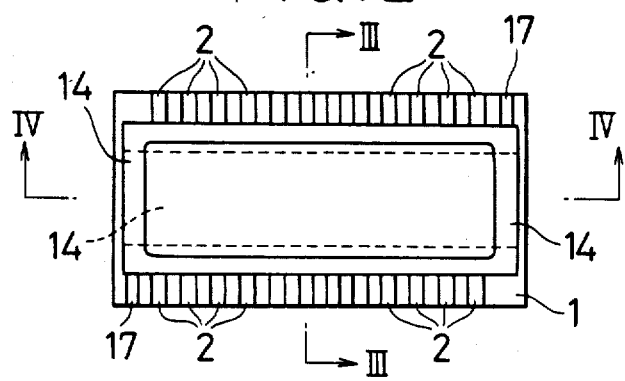
FIG. 2 is a bottom plan view of an ECD embodying this invention.
Figure 3:
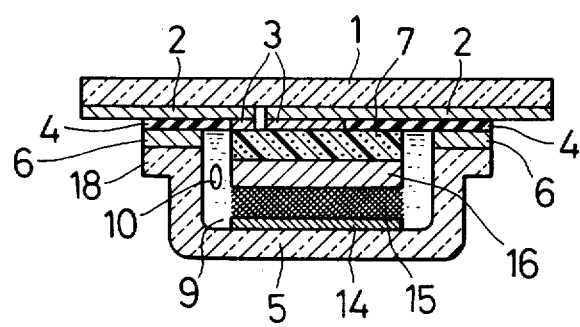
FIG. 3 is a sectional view taken along the line III—III of FIG. 2.
Figure 4:
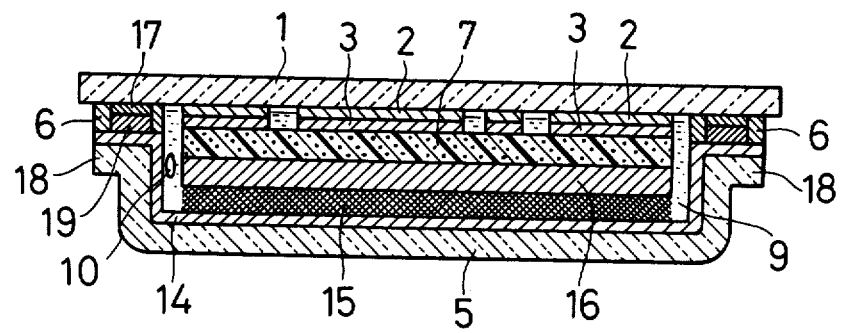
FIG. 4 is a sectional view taken along the line IV—IV of FIG. 2.
Figure 5:
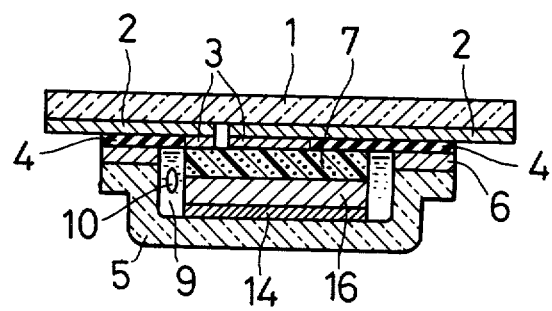
FIG. 5 is a view similar to FIG. 3, but showing another embodiment of this invention.

The device shown in FIG. 5 is similar in construction to that shown in FIGS. 2 to 4, and like numerals are used to indicate like parts throughout all of these figures. An important difference resides in the elimination of the conductive elastic material 15, and the positioning of the conductor 14 and the counter electrode 16 in contact with each other. The assembly of the device shown in FIG. 5 is completed by positioning opposite to each other the glass substrate 1 on which the electrochromic material 3, etc. are integrally provided, and the glass substrate 5 on which the conductor 14 is integrally formed, inserting the porous plate 7 and the electrode 16 therebetween, and holding the substrates 1 and 5 against each other until the adhesive 6 is cured. The adhesive 6 may be Toray Silicone Company's SE 1700 White (trade name), which is cured in about 10 minutes if left at 150° C. As the substrates 1 and 5 are held against each other until the solidification of the adhesive 6, the conductor 14 and the electrode 16 make substantial surface contact with each other, and the surface contact therebetween is maintained until after the curing of the adhesive 6. Then, the electrolyte 9 is introduced into the hollow space defined by the substrates 1 and 5.

FIGS. 6 TO 9

Figure 6:
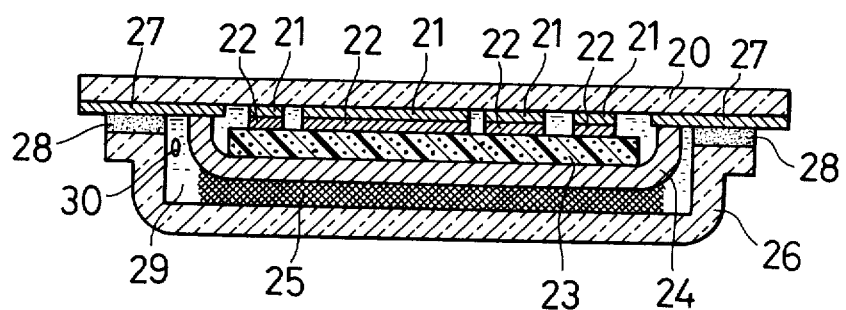
FIG. 6 is a view similar to FIG. 4, but showing still another embodiment of this invention.

Referring first to FIG. 6, a transparent electrode 21 is formed by evaporation on a transparent glass substrate 20. The electrode 21 may, for example, be formed from indium oxide or tin oxide. A layer of an electro-chromic material 22, such as a film of tungsten oxide (WO$_3$), is formed on the electrode 21 by evaporation. The electrochromic material 22 corresponds to each segment of the characters to be displayed. An insulating film is formed on the rest portion of the electrode 21. The insulating film may, for example, be formed from silicon oxide or aluminum oxide. A porous plate 23 covers the electrochromic material 22. The porous plate 23 has a white color to define a background upon development of a color by the electro-chromic material 22, and is composed of an electrically insulating material, such as ceramics and a fluorine-contained resin containing a pigment. A counter electrode 24 is positioned on the opposite side of the porous plate 23 from the electrochromic material 22. A cap-shaped glass substrate 26 having a flange is secured to the glass substrate 20 with an adhesive 28, e.g., Toray Silicone Ccompany's SE-1700. The substrates 20 and 26 define a gas-tight hollow internal space therebetween. An elastic material 25, such as a mass of glass fibers, is sandwiched between the electrode 24 and the substrate 26. The elastic material 25 exhibits elasticity along its thickness (i.e., vertically as viewed in FIG. 6) to hold the porous plate 23 and the electrode 24 in position and maintain the electrical connection between the electrode 24 and a terminal 27. The aforesaid hollow internal space is filled with an electrolyte 29 which may be a γ-butyrolactone solution of lithium perchlorate having a concentration of 1 mol per liter. The internal space includes a mass of bubbles 30 which absorb the thermal expansion of the electrolyte 29 to prevent rupture of the glass substrates 20 and 26, or the like.

The electrode 24 comprises a flexible plate obtained by molding at a pressure of 5 tons/cm$^2$ a mixture of manganese dioxide powder having a grain size of 300 mesh and expanded graphite (EXP-F 200 of Nippon Graphite, Japan) which are mixed in a ratio by weight of 50:50. The electrode 24 has a weight of 40 mg, and measures 55 mm by 20 mm by 0.25 mm. It has a specific resistance of less than 0.1 ohm-cm, and shows a polarization in the electrolyte 29 of less than 100 mV when a current of 10 mA/cm$^2$ is caused to flow for one second. According to the experiments conducted by the inventor of this invention, the electrode 24 maintained stability in its reversible potential during both the development and erasure of a color (i.e., at the display electrode during its oxidation and reduction) and even when it was left to stand at a high temperature of 70° C. Expanded graphite may be obtained if graphite is immersed in a mixed solution of sulfuric and nitric acids, washed with water, dried and heated.

According to the arrangement shown in FIG. 6, the fabrication of the device is completed by simply disposing the porous plate 23, the electrode 24 and the elastic material 25 between the glass substrate 20 on which the electro-chromic material 22 is provided, and the other glass substrate 26. Thus, the device can be manufactured by a very simple process. As the cap-shaped substrate 26 is not attached any conductor for supplying electric current, it is possible to prepare the cap-shaped substrate 26 from a molded organic polymer and thereby lower the cost thereof.

According to the experiments conducted by the inventor, no "uneven color development" of the kind observed in the known ECD device employing a tungsten oxide electrode occurred to the device of this invention when a constant voltage was applied across the electrode 21 and the terminal 27. The device of this invention showed a response time of only about 300 milliseconds by virtue of the small degree of polarization in the electrode 24, as opposed to a response time of about one second in the event the electrode comprised a molded product composed of manganese oxide and carbon powders, and an organic polymer binder such as an epoxy, silicone or phenolic resin.

Figure 7:
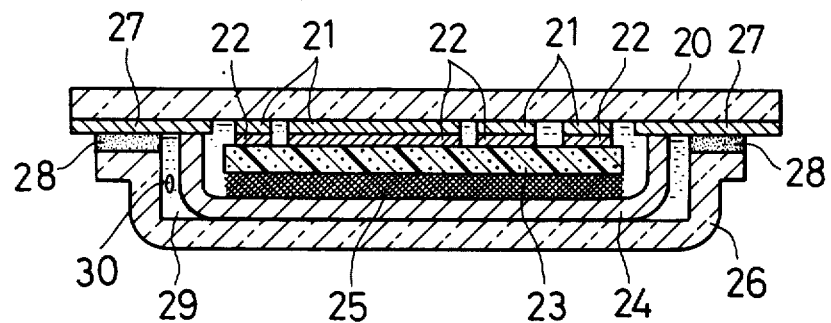
FIGS. 7 to 9 are cross-sectional views showing further embodiments of the ECD according to this invention.

Referring to FIG. 7 showing another embodiment of this invention in cross section, the device shown therein is similar in construction to that shown in FIG. 6, and like numerals are used to indicate like numerals throughout FIGS. 6 and 7. A dividing layer 25 impregnated with the electrode is provided between the electrode 24 and the porous plate 23, and exhibits elasticity across its thickness to hold the porous plate 23 and the electrode 24 against displacement, maintains the necessary spacing between the electrodes 21 and 24, and prevents diffusion of any impurity from the electrode 24. The impregnated layer 25 may, for example, be formed from nonwoven fabric, nonwoven mat or fine porous membrane filter which are made of asbestos, glass fiber or a synthetic resin such as polypropylene or polyfluoroolefin.

Figure 8:
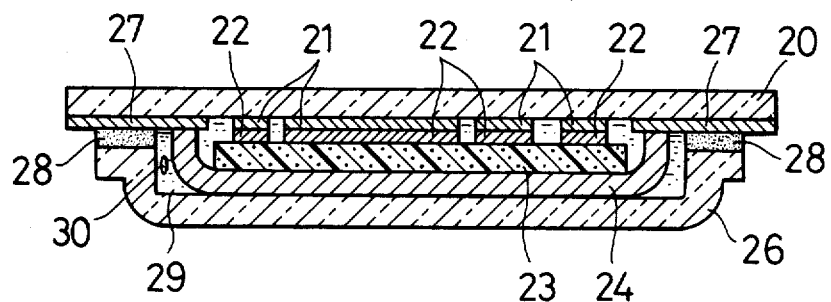

In the embodiment shown in FIG. 8, the device does not include any such impregnated layer as shown at 25 in FIG. 7.

Figure 9:
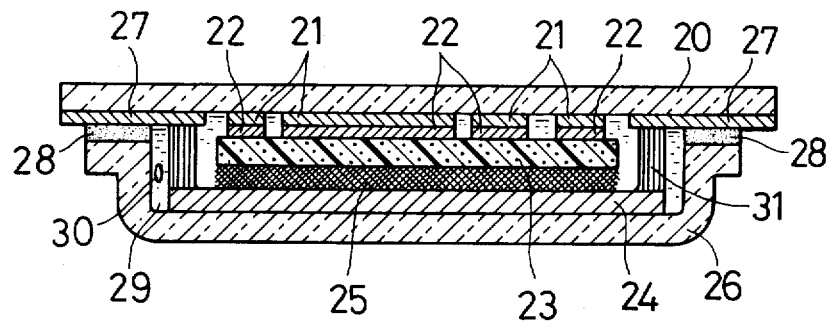

The device shown in FIG. 9 is similar to those shown in FIGS. 7 and 8, but includes between the electrode 24 and the terminal 27 a conductive elastic material 31 through which the electrode 24 is electrically connected with the terminal 27. The material 31 may, for example, comprise carbon fibers.

Table 1 below shows the experimental data obtained by the inventor of this invention concerning the electrode 24 (counter electrode) shown in FIG. 6. Several samples of the electrode 24, of which each was composed of manganese dioxide powder having a grain size of 300 mesh as the solid oxidation-reduction active material, and expanded graphite powder (EXP-F200 of Nippon Graphite, Japan) as the conductor were prepared in accordance with different proportions by weight of the manganese dioxide and graphite powders, and different molding pressures at room temperature.

TABLE 1

| Proportion (wt. %) | Manganese dioxide | 80 | 70 | 50 | 30 |
|---|---|---|---|---|---|
| | Expanded graphite | 20 | 30 | 50 | 70 |
| Molding pressure (ton/cm$^2$) | 5 | o | o | o | o |
| | 3 | o | x | o | o |
| | 1 | x | x | o | o |

The symbol "o" indicates that an electrode exactly reproducing the configuration of the mold was obtained, while the symbol "x" indicates that no such successful product could be obtained. All of the samples marked "o" were found satisfactory for use as the electrode 24. As the molding operation was carried out at room temperature, it was possible to obtain electrodes capable of maintaining stability in potential without encountering any decomposition of manganese dioxide as their activity, or any phase transition of its crystal-structure.

Table 2 shows the results of the tests conducted with the electrodes prepared by employing other solid oxidation-reduction active material as well.

TABLE 2

| Active material | Proportion (wt. %) | | Molding pressure (ton/cm$^2$) | Polarization* characteristics | Potential* flucuation |
|---|---|---|---|---|---|
| | Active material | Expanded graphite | | | |
| MnO$_2$ | 50 | 50 | At least 1 | No change | Not more than 50 mV (as compared with the initial value) |
| Mn$_2$O$_3$ | 50 | 50 | At least 1 | No change | Not more than 50 mV (as compared with the initial value) |
| Prussian blue | 50 | 50 | At least 1 | No change | Not more than 100 mV (as compared with the initial value) |
| Tungsten bronze | 50 | 50 | At least 1 | No change | Not more than 50 mV (as compared with the initial value) |

*Test Conditions:
Writing in accordance with the following waveform was repeated for 40 days on a display electrode composed of WO$_3$ at a constant temperature of 60° C.:
Driving: 300 m sec (+1.5 V);
Memory: 700 m sec;
Erasure: 1 sec (−1.5 V);
Total: one cycle — 2 sec.
The electrode had a surface area of 11 cm$^2$ (on the counter side) and 1.5 cm$^2$ (on the display side), and a charge density of the display electrode coloration of about 8 mC/cm$^2$.

FIGS. 10 AND 11

A conductor 121 is disposed between a counter electrode 119 and a substrate 125, and electrically connected with the electrode 119. The conductor 121 may be formed by at least one filament of carbon fibers, for example, those known as Carbolon-z-3 (Nippon Carbon, Japan), or TORAYCA ® filament T-500 or T-300 (Toray, Japan). The carbon filaments may have a diameter of about 7 microns which is approximately equal to, or less than the thickness of the adhesive layer which may be about 10 microns. Therefore, it is possible to have the carbon filament extend outwardly of the cell through the adhesive layer without varying the thickness of the adhesive layer, i.e., without lowering its adhesive strength. The conductor 121 extending outwardly of the cell is electrically connected with an external terminal 124 by an electrically conductive resin 123.

FIGS. 12 AND 13

Figure 10:
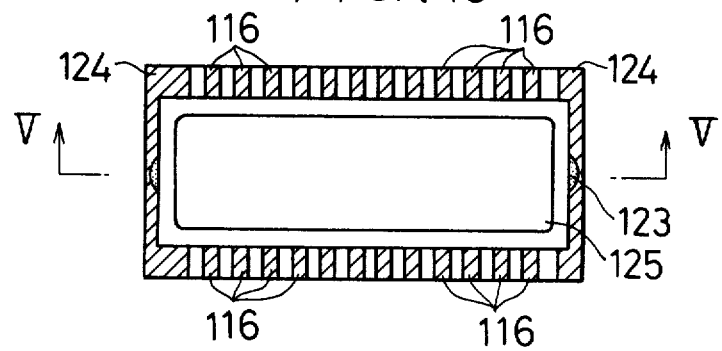
FIG. 10 is a bottom plan view showing a still further embodiment of this invention.
Figure 11:
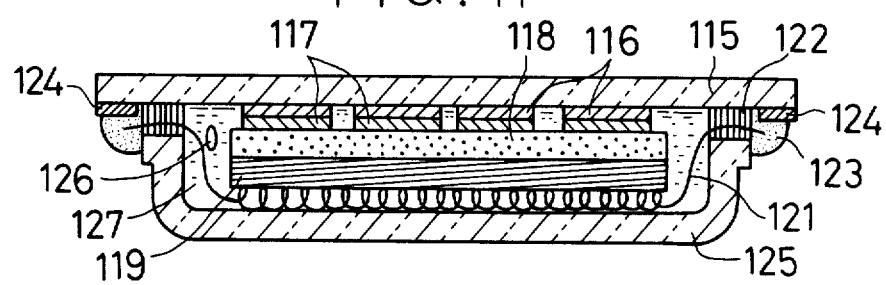
FIG. 11 is a sectional view taken along the line XI—XI of FIG. 10.
Figure 12:
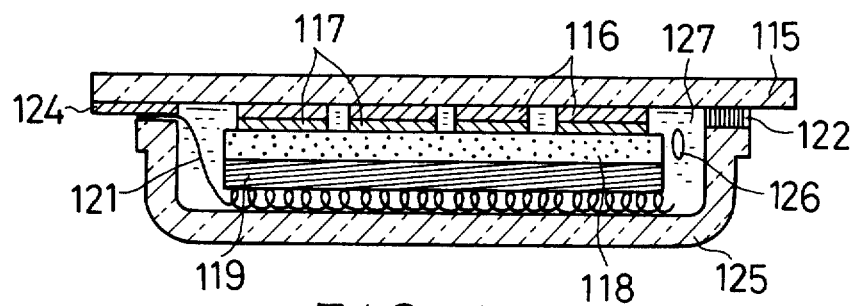
FIGS. 12 and 13 are cross-sectional views showing still further embodiments of this invention.
Figure 13:
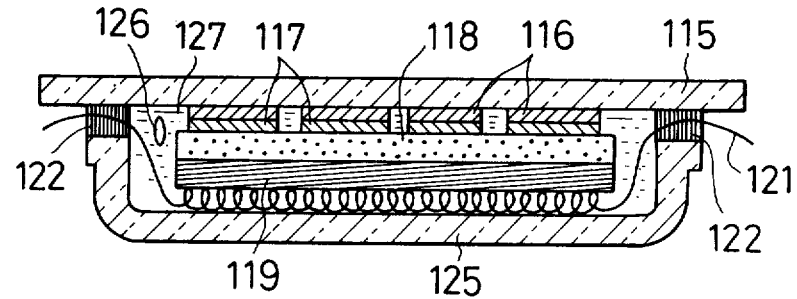

The devices shown in FIGS. 12 and 13 are similar in construction to that shown in FIGS. 10 and 11, and like numerals are used to indicate like parts throughout all of these figures. According to the arrangement shown in FIG. 12, the electrical connection between the conductor 121 and the external terminal 124 is established at the junction between the glass substrates 115 and 125. This arrangement permits formation of the electrode 116 and the external terminal 124 on the same plane with the glass substrate 115, and facilitates connection of the cell with a driving circuit by any ordinary connector. No conductive resin of the type shown at 123 in FIG. 11 is required any longer.

FIG. 13 shows an arrangement in which the conductor 121 draws out of the cell directly.

As the conductor making the electrical connection of the electrode with an external terminal or the like outside the cell projects outwardly through the adhesive layer between the substrates, it is no longer necessary according to this invention to use a lead wire connected to the electrode and extending outwardly through one of the glass substrates as has hitherto been the case in the art. Therefore, this invention facilitates the manufacture of the ECD devices, improves their productivity, and lowers the cost of their manufacture.

In the explanation as mentioned above, tungsten oxide is exemplified as an electro-chromic material at the display side. Other electro-chromic materials however may be also used and their example are inorganic materials such as transient metal oxide compounds (e.g., $MoO_3$, $TiO_2$, $IR_2O_3$ or $RH_2O_3$); organic materials such as polymerized viologen or polymer-bound tetrathiafulvaren; inorganic materials such as silver deposit or organic materials such as viologen (the chlorides of certain quaternary bases derived from $\gamma$, $\gamma'$-dipyridyl) [cf. Shimizu and Inoue: Applied Physics, 47,972(1978)].

What is claimed is:

1. An electro-chromic display device comprising: a pair of substrates defining a cell; a display electrode composed of a plurality of segments provided on one of said substrates; a counter electrode disposed opposite to said display electrode and electrically connected to a conductor for supplying electric current, said counter electrode being formed from a molded product comprising a mixture of a solid oxidation-reduction active powder material and a conductor powder, said molded product being obtained by pressure molding; and an electro-chromic material, and an electrolyte disposed between said electrodes.

2. A device as set forth in claim 1, wherein said active material is selected from the group consisting of $MnO_2$, $Mn_2O_3$, RFe(II) wherein R stands for $NH_4$, H, K or Na, and $M_xWO_3$ wherein M stands for H, Li or Na and x is larger than 0.01, but smaller than 0.7.

3. A device as set forth in claim 1 or 2, wherein said conductor in said mixture is selected from the group consisting of expanded graphite and active carbon.

4. A device as set forth in claim 1, wherein said active material and said conductor in said mixture have a mixing ratio by weight of 1:1 to 20.

5. A device as set forth in claim 1, wherein said molded product is obtained by molding at a temperature between room temperature and 100° C.

6. A device as set forth in claim 1, wherein said conductor for supplying electric current is secured to the substrate at the display electrode side, and electrically connected to said counter electrode within said cell.

7. A device as set forth in claim 6, wherein said conductor for supplying electric current and said counter electrode are directly in contact with each other.

8. A device as set forth in claim 6, further including a conductive elastic material disposed between said conductor for supplying electric current and said counter electrode.

9. A device as set forth in claim 8, wherein said conductive elastic material comprises carbon fibers.

10. A device as set forth in claim 1, wherein said conductor for supplying electric current is secured to the other of said substrates, and a conductive elastic material is disposed between said conductor for supplying electric current and said counter electrode.

11. A device as set forth in claim 10, wherein said conductive elastic material comprises carbon fibers.

12. A device as set forth in claim 1, wherein said conductor for supplying electric current comprises an electric conductive wire which extends outwardly of said cell through an adhesive layer between said substrates to define an external terminal or be connected to a separate external terminal.

13. A device as set forth in claim 12, wherein said conductive wire is formed by at least one carbon filament.

14. An electro-chromic display device comprising: a pair of substrates defining a cell; a display electrode composed of a plurality of segments provided on one of said substrates; a counter electrode disposed opposite to said display electrode and electrically connected to a conductor for supplying electric current, said counter electrode being formed from a molded product comprising a mixture of a solid oxidation-reduction active powder material and a conductor powder composed of expanded graphite, in the absence of a binder; and an electro-chromic material, and an electrolyte disposed between said electrodes.

15. A device as set forth in either of claims 1 or 14, wherein said active material is selected from the group consisting of: MnO, $MnO_2$, $Mn_2O_3$, $Mn_3O_4$, $V_2O_5$, cobalt complex, iron complex, and Prussian blue.

* * * * *